US005233741A

United States Patent [19]

Maynard

[11] Patent Number: 5,233,741

[45] Date of Patent: Aug. 10, 1993

[54] PUSHER TOOL FOR REMOVING A HUB SHAFT

[76] Inventor: Wade Maynard, 4281 Wakonda Dr., Norwalk, Iowa 50211

[21] Appl. No.: 707,769

[22] Filed: May 30, 1991

[51] Int. Cl.[5] .......... B23P 19/04

[52] U.S. Cl. .......... 29/266; 29/264

[58] Field of Search .......... 29/258, 259, 260, 263, 29/264, 266; 403/362

[56] References Cited

U.S. PATENT DOCUMENTS 1,636,364 7/1927 Hoegger .......... 403/362

2,684,527 7/1954 Hedlund .......... 29/266

*Primary Examiner*—Bruce M. Kisliuk

*Assistant Examiner*—Eileen P. Morgan

*Attorney, Agent, or Firm*—Jerome Goldberg

[57] ABSTRACT

A tool for pushing a half shaft out from an opening in the hub of a motor vehicle and for installing a hub onto the half shaft. The tool includes a housing attached to the lug bolts of the hub and having an opening for receiving a drive screw. A contactor is secured to the forward end of the screw for abutting the outer end of the shaft. As the screw is rotated to move in a forward direction, the contactor in response moves longitudinally in the forward direction, to push the shaft out from the hub. To install the shaft in the hub, a rammer is secured to the bolts of the hub. The rammer includes a head end for abutting the area of the hub circumscribing the hub opening and an impact end. Upon applying a force to the impact end, the head end pushes the hub over the shaft. A cavity is formed rearward from the head end of the rammer to receive the outer end of the shaft when it extends outward from the hub.

8 Claims, 3 Drawing Sheets

PUSHER TOOL FOR REMOVING A HUB SHAFT

BACKGROUND OF INVENTION

This invention relates generally to a tool for pushing the half shaft out from the hub of a motor vehicle and installing the half shaft inside the hub.

The half shaft has an external spline body (may be referred to as a "male spline") which meshes with the internal spline configuration (may be referred to as a "female spline") on the inside tubular wall of the hub opening. The spline connection includes a plurality of successive ridges and slots. The ridges of the shaft spline fit into the slots of the spline wall of the hub opening; and the ridges of the hub spline wall are received in the slots of the shaft spline.

Previous to the invention herein, many auto garages would loosen the half shaft from the hub opening by pounding the outer end of the half shaft with a hammer. This involved much effort and the expenditure of substantial time to free the half shaft, and, therefore, a costly charge for the vehicle owner. Moreover, the variation in the magnitude and direction of the applied force would often bend the half shaft and damage the spline connectors.

Axle pusher tools were often used in the past to remove the half shaft from the hub. However, in many instances the forces were also applied unevenly and would cause bending of the half shaft and damage to the spline structures. Even when substantially constant forces were applied, the pusher member would move or vibrate laterally and cause the shaft to deform or weaken the spline structures. Moreover, these axle pushers would move inside the hub opening and at times would also damage the internal spline.

Furthermore, the continuous impact against the outer end of the shaft often deformed the outer end, causing difficulty in mounting the wheel on the hub. The bending and deformation of the half shaft when removing and installing the half shaft created an unsafe and dangerous condition.

The subject invention overcomes these prior problems by providing a tool for removing and installing a half shaft in the hub of a motor vehicle which provides an even distribution of force and includes safeguards to prevent any moving part of the tool from damaging the internal spline in the hub or the external spline of the shaft.

It is therefore a primary object of the invention to provide a tool for applying an even distribution of force when pushing or installing the half shaft inside the hub.

It is another object to prevent damage to the internal spline and the external spline which mate together.

SUMMARY OF THE INVENTION

In accordance with one embodiment of the invention, a tool is provided for pushing a half shaft out of a motor vehicle hub comprising a housing attached to the lug bolts of the hub and having a threaded opening to receive a drive screw. A contactor is secured to the forward end of the screw for abutting the outer end of the half shaft. As the screw is rotated to move in the forward direction, the contactor in response moves longitudinally to push the shaft out from the hub opening.

A bore is formed rearward from the forward end of the screw to receive the back portion of the contactor. A circular notch is formed in the back portion of the contactor to receive a lateral retaining pin passing through an aperture in the drive screw. The retaining pin maintains the contactor secured inside the bore and prevents the contactor from detaching from the drive screw. When the drive screw rotates to move in the forward direction, the rear wall inside the bore of the drive screw, as it rotates, bears against the back end of the contactor to move the contactor longitudinally in the forward direction; and simultaneously the retaining pin revolves within the notch of the contactor.

The half shaft has an external male spline body and the wall defining the opening in the hub has an internal female spline configuration. The diameter of the drive screw is greater than the diameter of the hub opening to prevent the screw fron entering and causing possible damage to the internal spline wall.

In accordance with another embodiment of the invention, a tool is provided for installing a half shaft into a motor vehicle hub comprising a rammer having a head end and an inpact end. A plate is positioned on the rammer and secured to the lug bolts of the hub. The head end of the rammer is positioned so that it circumscribes the area around the hub opening. Upon applying a force at the impact end of the rammer, the head end thereof pushes the hub forward over the half shaft, so that the shaft is received in the hub opening. Hence, the installing tool and hub move together as a single unit.

A shoulder is circularly formed around the outside of the rammer between the ends thereof. The forward side of the plate contacts the shoulder when attached to the bolts of the hub. With this attachment arrangement, the hub and rammer move forward simultaneously.

The head end of the rammer includes a circular lip leading into a cavity formed rearward therefrom. The cavity is dimensioned to receive the outer end and neck of the half shaft when it extends outward from the hub during the installation of the half shaft into the hub.

Therefore, a primary feature of the invention is to provide a contactor attached to a drive screw which does not rotate but moves longitudinally as the drive screw rotates in a forward direction, to provide a substantially constant and even longitudinal abutting force against the outer end of the half shaft for pushing the shaft out from the hub opening. A related feature is to provide a housing for attaching to the motor vehicle hub and including an opening for receiving the drive screw.

Another feature is to dimension the diameter of the drive screw greater than the diameter of the hub opening which receives the half shaft, to prevent the passage of the drive screw into the hub opening.

Another feature is to provide a contactor having a circular groove formed therein to receive a retaining screw for preventing the contactor from slipping out from a bore formed in the forward end of the drive screw. A related feature is to have the retaining screw revolving within the groove as the drive screw is rotated.

Another primary feature is to provide a rammer for attaching to the hub of a motor vehicle which pushes the hub over the half shaft, upon applying a force to the rammer. A related feature is that the hub and rammer move simultaneously to position the hub over the shaft.

Another feature is to provide a removable plate for securing a rammer to the hub, so that the rammer and hub move simultaneously when positioning the hub on the half shaft. A related feature is to provide a circular shoulder around the rammer for contacting the plate to prevent independent forward movement of the plate. Another related feature is to secure the plate to the lug bolts of the hub to prevent independent rearward movement of the plate.

Still another feature is to provide a head end of a rammer including a lip surrounding an entrance into a cavity formed rearward therefrom to receive the outer end of the half shaft, when the shaft extends outward from the hub during the positioning of the hub over the shaft.

BRIEF DESCRIPTION OF THE DRAWINGS

Referring to the drawings in which the same characters of reference are employed to indicate corresponding similar parts throughout the several figures of the drawings.

DESCRIPTION OF THE PREFERRED EMBODIMENT

Figures 1, 2, 3, 4, 5:
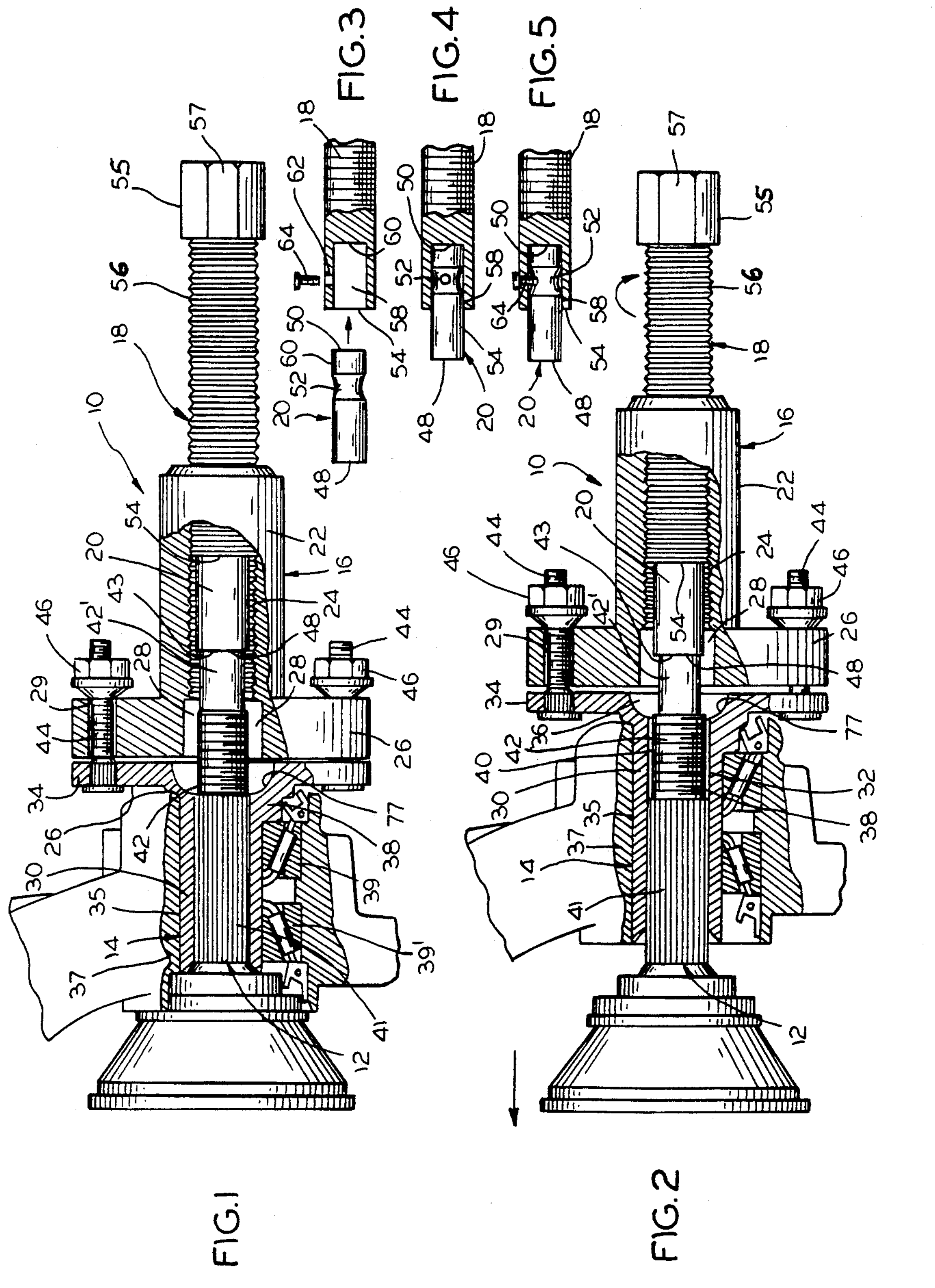
FIG. 1 is a side view of the tool with portions cut away when used to push the half shaft out from the hub of a motor vehicle and embodying the principles of the invention.
FIG. 2 is a side cut away view of the tool similar to FIG. 1, but showing the half shaft partially removed from the hub.
FIG. 3 is a side view of the contactor spaced from the forward end of the drive screw shown in cross section.
FIG. 4 is a side sectional view of the contactor secured in the forward end of the drive screw.
FIG. 5 is a side sectional view similar to FIG. 4 but showing the lateral retaining screw inside the groove of the contactor.

Referring now more particularly to FIGS. 1, 2, 6, 6A and 7 of the drawings, the reference numeral 10 indicates generally a tool embodying the principles of the invention when used for pushing a half shaft 12 out from a wheel hub 14 of a motor vehicle. The tool device 10 comprises a substantially "T" shaped housing 16 and a drive screw 18 driving a contactor 20.

The housing 16 includes a cylindrical body 22 having a cylindrical bore 24 and a substantially square shaped base 26 integrally formed to the body 22. A central opening 28 is formed in the base 26 in communication with the bore 24. Four apertures 29 are formed in base 26, equally spaced apart and positioned outward from the opening 28. The bore 24 is threaded to receive the screw 18 and the base opening 28 has a larger diameter than the the bore 24.

Figure 6:
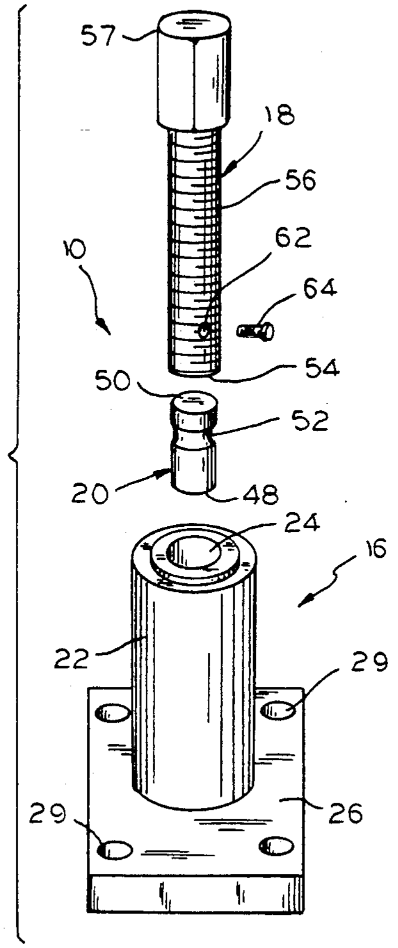
FIG. 6 is a perspective view of the component parts of the tool when used to remove the half shaft from the hub.
Figure 6A:
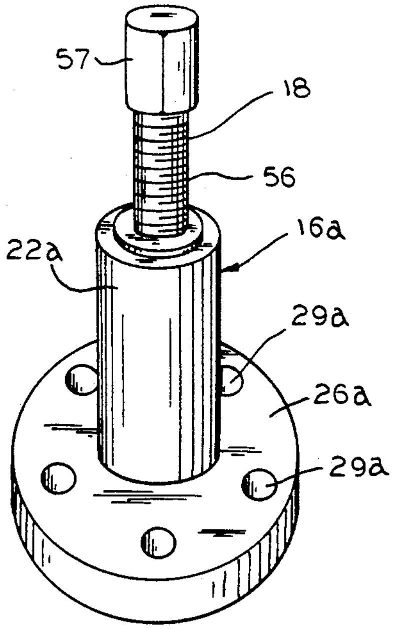
FIG. 6A is a perspective view of the tool when used to remove the half shaft from a hub having five lug bolts.

Alternatively as illustrated in FIG. 6*a*, a housing 16*a* having a circular base 26*a* may be integrally formed to the body 22. The base 26*a* is shown having five apertures 29*a* equally spaced apart and positioned outward from the opening 28*a*.

Figure 7:
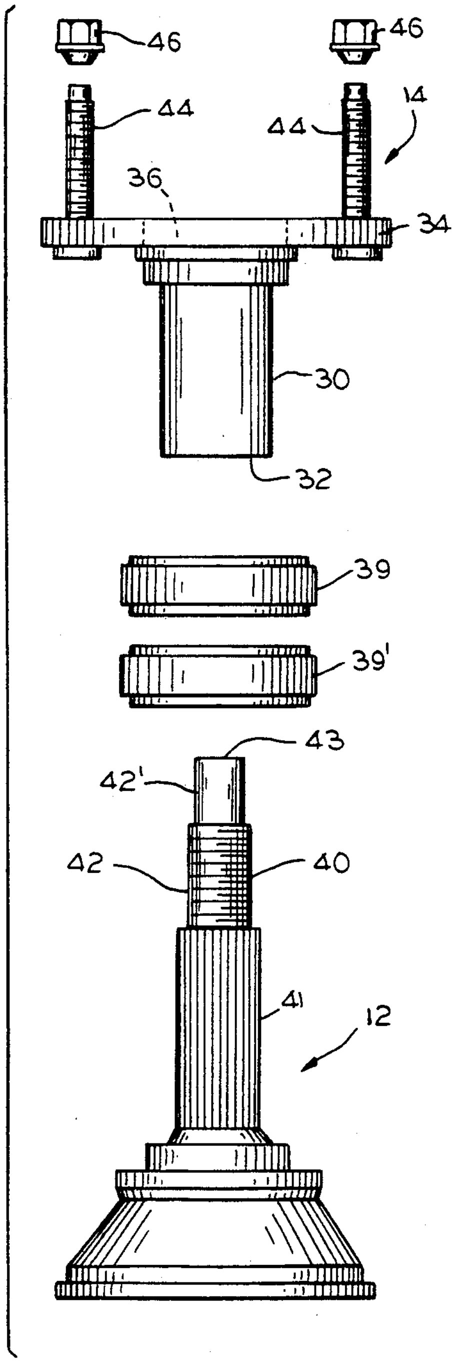
FIG. 7 is a side view of the half shaft, the hub, and bearing rings which are positioned on the hub.

Turning now more specifically to FIGS. 1, 2 and 7, the hub 14 includes a tubular portion 30 having a cylindrical opening 32 and a flanged portion 34 integrally formed to the outer end of the tubular portion 30. A cavity 36 is centrally formed in the flange 34 in communication with the opening 32. The diameter of the cavity 36 is greater than the diameter of the opening 32.

The tubular portion 30 of the hub 14 fits inside the bore 35 in the hub support 37. The internal defining wall 38 of the opening 32 of the hub 14 has a female spline configuration. An inner bearing race 39 and an outer bearing race 39' are positioned on the outside of hub 14.

The half shaft 12 comprises a neck portion 40 and an external male spline body 41. The neck portion 40 includes a threaded segment 42 and a non-threaded segment 42' including outer end 43. The male spline body 41 is received in the female spline wall 38 inside the hub opening 32.

The flanged portion 34 of the hub 14 includes four threaded lug bolts 44. Other vehicle hubs may have five lug bolts 44 which would require the base 26*a* having five apertures 29*a*. Threaded lug nuts 46 normally secure the wheel on the lug bolts 44. These lug nuts 46 are utilized for securing the housing 26 or 26*a* of the tool 10 on the hub 14.

Turning now to FIGS. 3, 4, 5 and 6, it will be seen that the contactor 20 has a tubular shape and comprises a head end 48 and a back end 50. A circular groove 52 is formed in the contactor 20 adjacent the back end 50 thereof.

The screw 18 includes a front end 54 and a rear end 55 with a threaded body 56 therebetween. The rear end 55 includes an hexagonal nut 57 for applying an external rotational force with a wrench or other suitable tool.

A tubular bore 58 is formed rearward from the front end 54 of the screw 18 and dimensioned to receive the back portion of contactor 20. (FIGS. 3, 4 and 5). The rear wall 60 inside the bore 58 is opposed to the back end 50 of the contactor 20. As the screw 18 rotates for movement in the forward direction, the rear wall 60 bears against the back end 50 of the contactor 20 to force the contactor to move in the forward direction.

A lateral threaded aperture 62 is formed adjacent the front end 54 of the screw 18 perpendicular to and in communication with the bore 58. A threaded pin 64 passes through the lateral aperture 62 and extends into the circular groove 52 in the contactor 20. The pin 64 prevents the contactor 20 from slipping out and detaching from the front end 54 of the screw 18. When the screw 18 is rotated in the direction for moving the screw 18 forward, the pin 64 revolves within the groove 52 of the contactor 20, as the contactor moves longitudinally in response to the bearing force provided by the rear wall 60 inside the bore 58.

Figure 8:
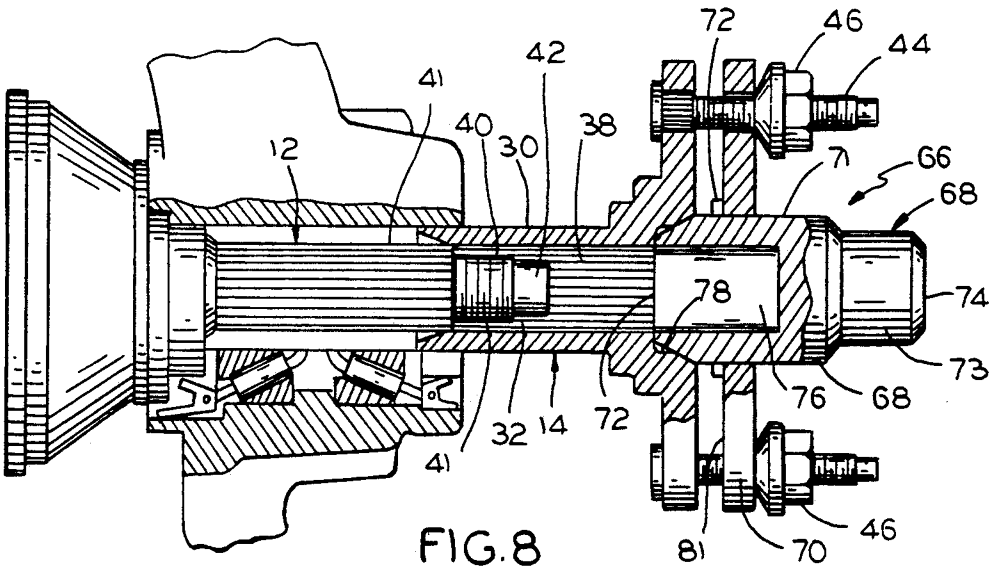
FIG. 8 is a side view with portions cut away to illustrate the tool when used to install the half shaft inside the hub, embodying the principles of the invention, and showing the position of the hub when commencing the installation of the shaft.
Figure 9:
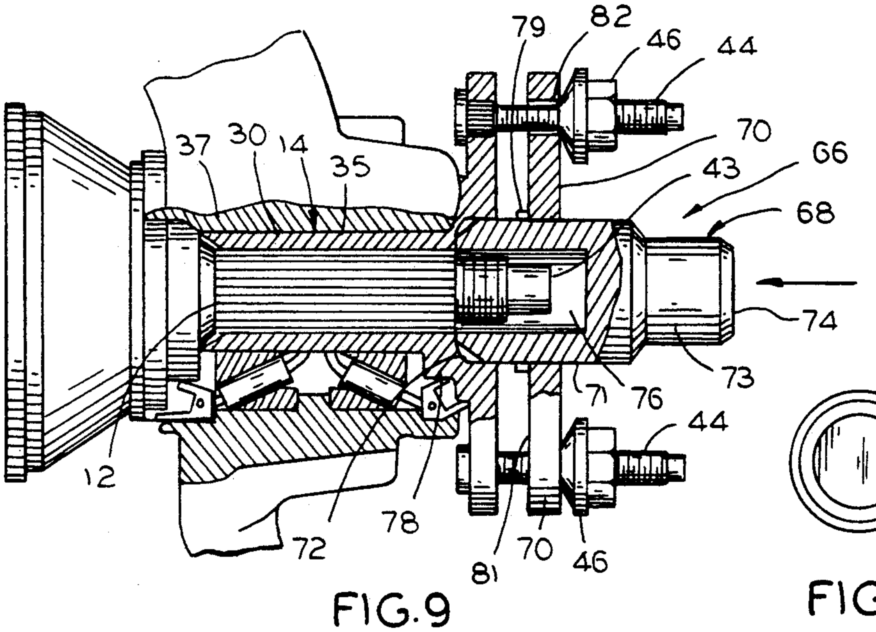
FIG. 9 is a side view with portions in section similar to FIG. 8, and showing the half shaft installed in the hub.
Figure 11:
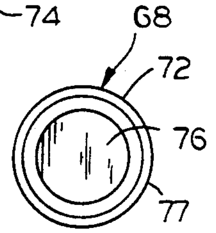
FIG. 11 is a front view of the head end of the rammer.
Figure 10:
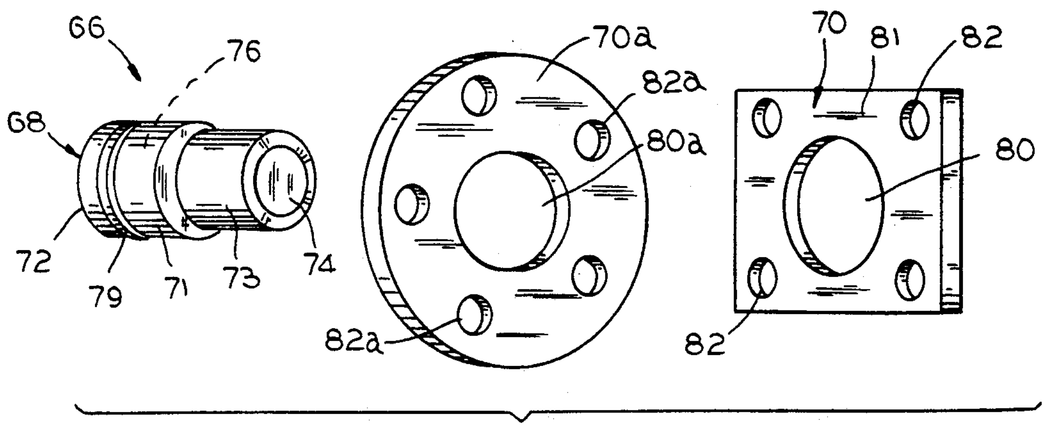
FIG. 10 is a perspective view of the parts of the tool when used to install the shaft in the hub and showing the rammer and a plate for attaching to a hub having four lug bolts and a plate for attaching to the hub having five lug bolts.

Referring now to FIGS. 8, 9 and 10 of the drawings, the reference numeral 66 indicates generally a tool, embodying the principles of the invention when installing the half shaft 12 inside the hub 14. The tool 66 comprises a rammer 68 and a removable plate 70 positioned on the rammer 68 and secured to the flange 26 of the hub 14.

The rammer 68 is divided into a body section 71 having a head end 72 and a strike section 73 having an impact end 74. The circumference of the body section 71 is greater than the circumference of the strike section 73.

A cavity 76 is formed rearward from the head end 72 and dimensioned to receive the neck portion 40 of the drive shaft 12. The head end 72 includes a circular lip 77 for contacting the rim 78 inside the hub 14, circumscribing the entrance into the opening 32.

A circular shoulder 79 is formed on the outside of the body section 71 of the rammer 68, spaced from the head end 72 and protrudes outward therefrom. The strike section 73 is a solid mass of metal and substantially heavier than the body section 71.

A central hole 80 is formed in the plate 70 having a radius slightly larger than the radius of the circumference of the body section 71, so that the plate 70 is fitted on the body section 71 and the forward side 81 abutts the shoulder 78. The radius of the circumference of the shoulder 79 is greater than the radius of the hole 80, so that the plate 70 is inhibited from sliding toward the head end 72 of the rammer 68.

The plate 70 has a square shape and includes four apertures 82 equally spaced apart outward from the central hole 80. The apertures 82 receive the lug bolts 44 on the flange 36 of the hub 14. The lug nuts 46 tighten the plate 70 in place and prevent the plate from moving backward toward the impact end 74 of the rammer 68. Thus, the plate 70 is secured between the shoulder 79 and the lug nuts 46. When force is applied to the impact end 74 of the rammer 68, the rammer and hub move simultaneously for installing the hub over the half shaft.

Alternatively, if the hub 14 has five lug bolts 44 the circular plate 70*a* having five apertures 82*a* would be used. The size of the central hole 80*a* would be the same as the hole 80 of the square plate 70.

PUSHING THE SHAFT OUT FROM THE HUB

When pushing the shaft out from the hub 14, the tool 10 is secured to the hub 14. The apertures 29 of the base 26 of the housing 16 receive the four bolts 44 protruding outward from the hub flange 34, and the base 26 is secured on the bolts 44 with the lug nuts 46. If the hub flange has five lug bolts 44, the housing 16*a* having five apertures 29*a* would be used (FIG. 6A). At the start of the pushing procedure, the neck portion 40 of the half shaft 12 extends into the opening 28 of the housing base 26 and the threaded bore 24 in the body 22 of the housing 16. The drive screw 18 is rotated to move in a forward direction until the head end 48 of the contactor 20 firmly abutts the outer end 43 of the shaft 12. The screw 18 continues to be rotated in the forward direction and the rear wall 60 inside the bore 58 at the front end 54 of the screw 18, bears against the contactor 20 to cause the contactor to move longitudinally in the forward direction. This forces the shaft 12 inward and out from the opening 32 inside the hub 14 (FIG. 2).

Since the contactor 20 does not rotate as the drive screw 18 is rotated, the force is continually applied evenly by the head end 48 of the contactor 20 against the outer end 43 of the shaft 12, without causing lateral movement of the shaft. The contactor 20 moves longitudinally in the forward direction to push the shaft 12 inward and out from the hub 14, thereby dis-associating the external male spline body 41 of the shaft 12 from the internal female spline wall 38.

The body 56 of the screw 18 has a greater diameter than the opening 32 inside the tubular portion 30 of the hub 14, and, hence the front end 54 of the screw 18 would be blocked from entering the opening 32 and possibly cause damage to the internal spline wall 38.

INSTALLING THE HUB OVER THE SHAFT

The body 71 of the rammer 68 is passed through the central opening 81 of the plate 70 so that the forward side 81 of the plate abutts the shoulder 79 on the outside of the rammer 68. The apertures 82 of the plate 70 receive the four bolts 44 protruding outward from the hub flange 34 and the plate 70 is secured on the bolts 44 with the lug nuts 46. If the hub flange 34 has five lug bolts 44, the plate 70A having five apertures 29*a* would be used (FIG. 10). Now the tool 66 is secured to the hub 14, so that the tool 66 and hub 14 move together.

The half shaft 12 is positioned inside the bore 35 of the hub support 37. The forward or inner end 84 of the tubular portion 34 of the hub 14 is positioned over the half shaft 12, so that the neck 40 of the shaft 12 extends inside the opening 38 of the hub 14.

As may be seen from FIG. 8, the head end 72 of the rammer 68 is positioned in the cavity 36 on the inside of the hub 14, to contact the rim 78 circumscribing the entrance into the opening 32 having the internal spline 38. Upon applying a force against the impact end 74 of the rammer 68 with a hammer or other suitable tool, the force is evenly distributed around the lip 78 of the rammer 70 for bearing against the rim 72 inside the hub 14, and thereby causing the female spline 38 inside the hub 14 to move forward and mesh the with the male spline body 41 of the shaft 12. When initially tapping the impact end 74 of the rammer, the half shaft 12 should be pulled toward the hub 14.

Upon continuing to apply force against the impact end 74, the internal spline wall 38 moves over the spline body 41 of the shaft 14 until the hub is fully positioned over the shaft, and the neck portion 41 extends inside the cavity 76 of the rammer 68, as shown in FIG. 9. The lug nuts 46 are loosened and unscrewed, and the plate 70 and rammer 68 are removed from the hub 14.

The combination tool comprising the tool 10 for pushing the shaft out from the hub, and the tool 66 for pushing the hub on to the shaft, is secured to the hub when performing either function.

Safeguards are provided to prevent damage to the spline connectors of the hub and shaft: such as preventing the drive screw 18 from entering the inside of the hub opening, and providing firm contact of the contactor 20 with the outer end 43 of the shaft to prevent lateral movement, when pushing the shaft out from the hub; and distributing the applied force around the area circumscribing the hub opening for receiving the shaft, when pushing the hub onto the shaft.

There are various modifications of the invention of a pusher tool for removing and installing a hub shaft described herein, the scope of which is limited solely and defined by the appended claims.

I claim:

1. A tool for pushing a shaft out from an opening in a hub comprising:

a support means for associating with the hub;

a rotating means supported in said support means for rotating in one direction to move longitudinally in the forward direction (to move longitudinally upon being rotated);

a contactor means having a head end and a back end; and attaching means for revolving around the contactor means in response to rotation of said rotating means and simultaneously movably securing the contactor means longitudinally to the rotating means, said rotating means and said contactor means cooperating together so that the rotating means pushes the back end of the contactor means in the forward direction as the rotating means rotates in said one direction to cause the head end of the contactor means to push said hub in the forward direction.

2. The tool of claim 1, wherein said hub includes a flange having a plurality of openings for receiving a plurality of threaded bolts, and said tool further comprises:

said support means including a plurality of apertures for aligning with the hub openings for receiving said bolts to secure the support means to the hub, said support further including a threaded opening;

said rotating means being a drive screw having a front end and a rear end, said screw being received in the threaded opening;

a cavity formed inward from the front end of said drive screw to receive the back end portion of the contactor means;

said attaching means including a continuous notch formed in said back portion of said contactor means, a pin extending into said cavity and positioned inside said notch to prevent the contactor from detaching from said screw; and said cavity including an inner defining wall for bearing against the back end of said contactor to push the contactor in the forward direction and said pin to revolve in said notch when the drive screw is rotated to move in said forward direction.

3. The tool of claim 2, includes:

a threaded aperture formed in the drive screw in communication with said cavity; and said pin is threaded to pass through said aperture and into said notch.

4. The tool of claim 2, wherein:

the outside diameter of the screw is greater than the diameter of said hub opening; and the diameter of the contactor is less than the diameter of the hub opening for extending into said hub opening to push the shaft out from the hub opening.

5. A tool for pushing a shaft having an outer end and an inner end out from an opening in a hub comprising:

a drive screw, the diameter of said drive screw being greater that the diameter of said hub shaft to prevent the drive screw from entering said hub opening;

a support means for securing to the hub and having a threaded opening to engage said drive screw, said drive screw moving in a forward longitudinal direction when rotated in one direction; and a contactor means attached to said drive screw and having a head end for abutting said outer end of the shaft, said contactor moving in the forward direction for pushing the shaft out from the hub opening in response to said drive screw rotating in said one direction.

6. The tool of claim 5, wherein the outside surface of said hub shaft includes a plurality of spaced apart ribs and the defining wall of said hub opening includes a plurality of spaced apart grooves to receive said ribs of the hub shaft; and said contactor being dimensioned to extend into said hub opening without contacting the inside wall of the opening.

7. A tool for pushing a shaft having an outer end and an inner end out from an opening in a hub comprising:

a drive screw;

a support means for securing to the hub and having a threaded opening to engage said drive screw, said drive screw moving in a forward longitudinal direction when rotated in one direction;

a contactor having a head end and a back end, said head end abutting the outer end of the shaft; and attaching means for securing the contactor to the forward end portion of the screw, the contactor moving forward without rotating for pushing the shaft out from the hub opening when said screw is rotated in said one direction, the diameter of said contactor being less than the diameter of said hub opening to extend therein and the diameter of said drive screw being greater than the diameter of said hub opening to prevent said screw from entering said opening.

8. A tool for pushing a shaft out from an opening in a hub, said hub including a body portion having said opening and a flange formed to the hub body and having a hole in communication with the body opening, said flange including a plurality of apertures to receive bolts, and said tool comprising:

a housing having a front end and a rear end, said housing including a threaded opening;

a base secured to the front end of the housing and having a hole in communication with the threaded opening, said base including a plurality of holes to align with the apertures of the hub flanges to receive said bolts for securing the hub to the base;

a drive screw threadedly received in said housing opening, said screw having a front end and a back end;

a contactor having a head end and a back portion including a back end, said head end abutting the outer end of the shaft; and a cavity formed inward from the front end of said drive screw to receive the back portion of the contactor;

a continuous notch formed in the back portion of said contactor;

a pin extending into said cavity and positioned inside said notch to prevent the contactor from detaching from the drive screw, said pin revolving in said notch as said screw is rotated; and said cavity including an inner defining wall for bearing against the back end of said contactor to force the contactor to move in the forward direction when the drive screw is rotated to move in said forward direction.

* * * * *